Fig. 2.

INVENTOR
JEAN RENE GIRAUDON
BY
Bailey, Stephen & Huettig
ATTORNEYS

May 28, 1963

J. R. GIRAUDON

3,091,231

FUEL INJECTION PUMPS

Filed Sept. 6, 1961

INVENTOR
JEAN RENE GIRAUDON
BY
Bailey, Stephens & Huettig
ATTORNEYS

May 28, 1963  J. R. GIRAUDON  3,091,231
FUEL INJECTION PUMPS
Filed Sept. 6, 1961  6 Sheets-Sheet 6

INVENTOR
JEAN RENE GIRAUDON
BY
Bailey, Stephens & Huettig
ATTORNEY

United States Patent Office 3,091,231
Patented May 28, 1963

3,091,231
FUEL INJECTION PUMPS
Jean René Giraudon, Rueil-Malmaison, France, assignor to Societe Industrielle General de Mecanique Appliquee, S.I.G.M.A., Paris, France, a society of France
Filed Sept. 6, 1961, Ser. No. 136,234
Claims priority, application France Mar. 12, 1959
8 Claims. (Cl. 123—140)

The present invention relates to fuel injection pumps, for internal combustion engine, which include, in a frame forming a casing, a fixed body and a distributing valve rotatable in said body and driven by a coaxial shaft itself driven by the engine to which fuel is fed by the pump, the pumps with which this invention is concerned further including at least one pumping piston slidable in a transverse cylindrical housing provided in one of the two elements consisting of the fixed body and the driving shaft, said piston being reciprocated by means of a cam carried by the other of said two elements, the fixed body being provided with delivery conduits leading to the injectors of the engine and cooperating with distributing passages carried by the rotary valve and in communication with said housing, said pump further including a regulating member responsive to variations of the speed of the driving shaft, coaxial with said shaft and capable of periodically closing and opening discharge orifices provided in the first of said two above mentioned elements.

The object of this invention is to improve the operation of such pumps.

For this purpose, according to the present invention, the regulating member, which does not serve to transmit pumping stresses, is controlled by a single governor in such manner that it is first moved angularly with respect to the second of said two above mentioned elements, so as to vary the advance to injection, and then is moved axially, so as to vary the delivery of the pump per cycle thereof, as the speed at which the pump is driven increases.

Preferred embodiments of the present invention will be hereinafter described with reference to the accompanying drawings given merely by way of example and in which.

I will first describe the embodiment of my invention illustrated by FIGS. 1-7.

The pump includes a fixed body 1, preferably of steel, and a rotary and sliding valve 2 fitting in a bore 3 provided in said body and driven by a coaxial shaft 4 itself driven by the engine to be fed with fuel by the pump. Two opposed pumping pistons 5 are slidable in a diametral housing 6 substantially perpendicular to the common axis of valve 2 and shaft 4. These pistons are actuated by an annular cam 7 including a number of sections equal to the number of cylinders of the engine to be fed with fuel (four in the embodiment shown by the drawings). Body 1 is provided with radial delivery conduits 8 (FIG. 3) leading respectively to the injectors (not shown) of the engine through connecting members 9 provided with check-valves 10. These delivery conduits 8 are placed in communication with the pump housing 6 at the desired time in a manner which will be hereinafter described.

Annular cam 7 is carried by the driving shaft 4 (FIG. 2) and housing 6 is provided in portion 1a of body 1. Cam 7 acts on pistons 5 in the centripetal direction through rollers 11 and plates 12 whereas springs 13 urge these pistons in the centrifugal direction. Advantageously, as shown, springs 13 are helical springs disposed around pistons 5 and bearing upon shoulders of said pistons.

In the example shown, cam 7 is integral with shaft 4 and it is journalled through ball bearings 14 in a casing 15 into which shaft 4 penetrates with the interposition of a packing member 16.

Holes 57 provided in the casing facilitate the assembly of parts by permitting the passage of spindles which penetrate into the axial holes of rollers 11 and keep them in the position nearer to the axis of the shaft so that it is possible to engage these rollers in cam 7. When the rollers have thus been engaged, the spindles are withdrawn from holes 57 and rollers 11 pushed by return springs 13 come to bear upon the cam.

Figure 1:
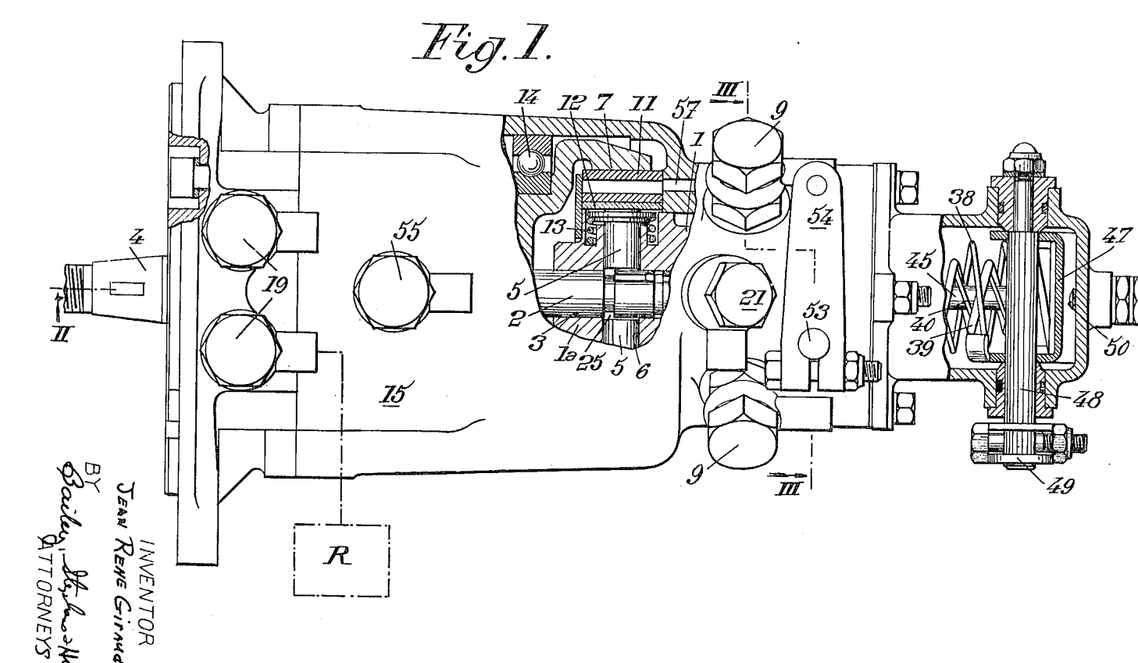
FIG. 1 is a plan view, with parts in horizontal section, of the pump made according to a first embodiment of the invention.
Figure 2:
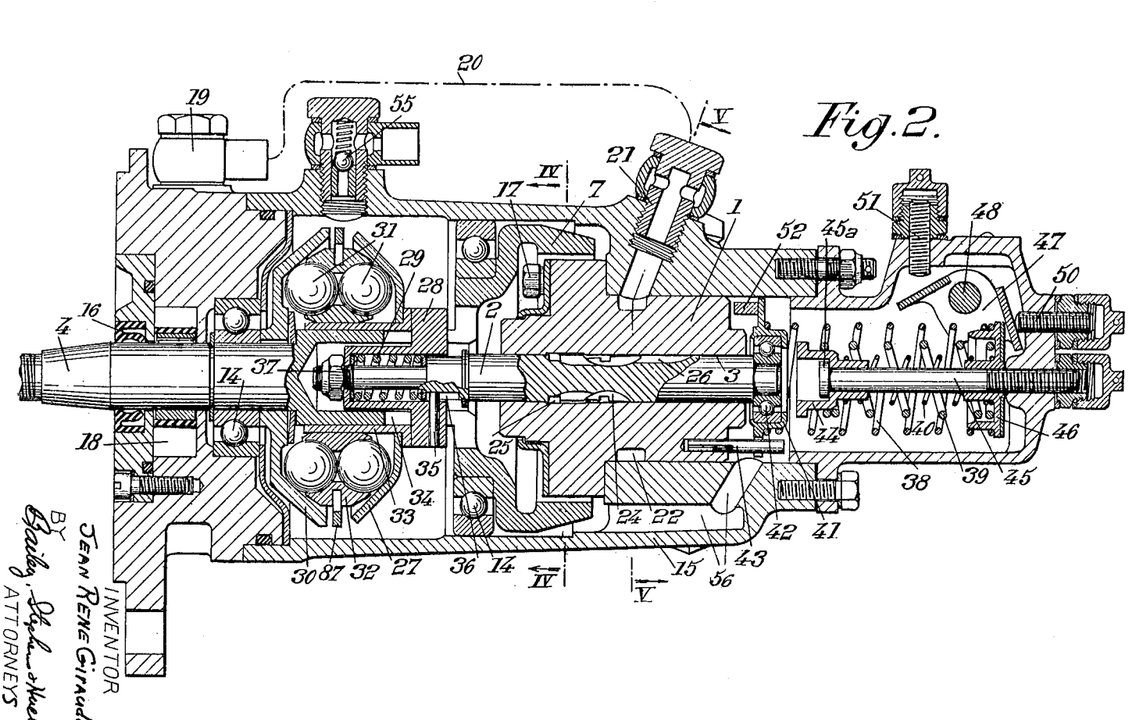
FIG. 2 is a longitudinal section on the line II—II of FIG. 1.
Figure 3:
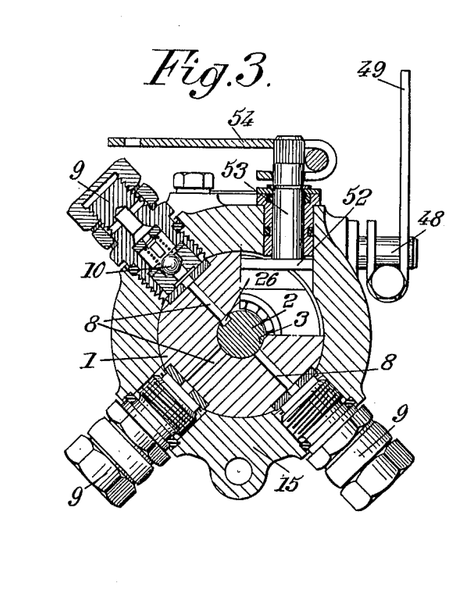
FIG. 3 is a cross section on the line III—III of FIG. 1.
Figure 4:
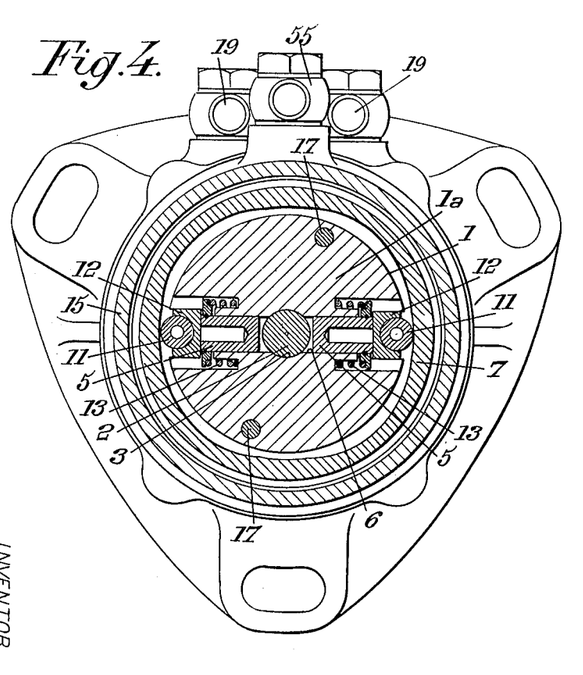
FIG. 4 is a cross section on the line IV—IV of FIG. 2.

As for distributing valve 2, it consists of a piece distinct from shaft 4 and coupled therewith through means which will be hereinafter described in detail. This valve is housed with a sliding fit in the bore 3 of body 1, this last mentioned body being fixed to casing 15 by means of screws 17 (FIG. 2).

The feed circuit leading to the pump housing 6 is made as follows.

Figure 5:
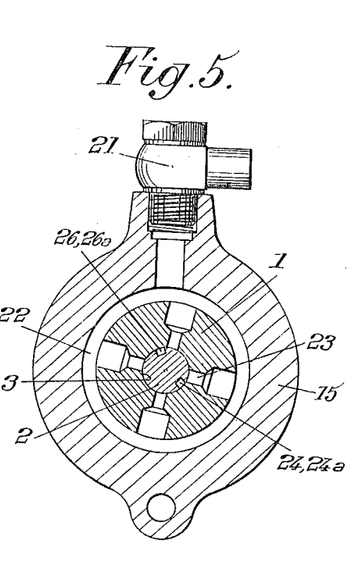
FIG. 5 is a cross section on the line V—V of FIG. 2.
Figure 6:
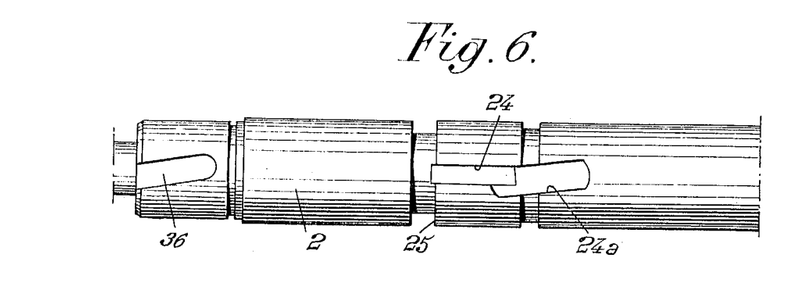
FIGS. 6 and 7 are partial views showing the distributing valve of the pump seen respectively from the bottom and from the top with respect to FIG. 2.
Figure 7:
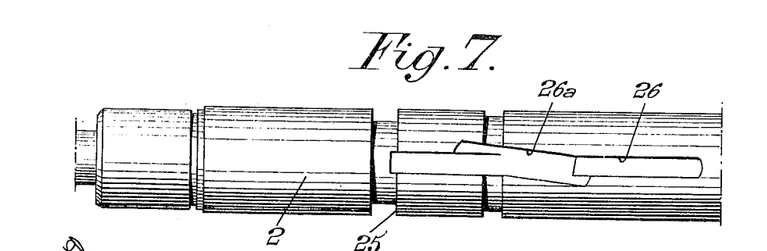

Shaft 4 carries (FIG. 2) a feed pump 18 preferably of the blade type. Two conduits 19 communicate with this pump 18, one of them being in communication with a fuel tank R (FIG. 1) whereas the other leads through a pipe 20 to an intake connection 21, a filter being provided in this pipe. Connection 21 communicates (FIGS. 2 and 5) with a groove 22 provided at the periphery of body 1 and closed by a cylindrical wall belonging to casting 15 (as shown by FIG. 2). This groove 22 in turn communicates with the axial bore 3 through radial conduits 23 distributed about the axis of the pump and the number of which is equal to the number of cylinders of the engine to be fed with fuel (FIG. 5). These conduits 23, which thus open into the cylindrical wall of bore 3 are intended to cooperate with a longitudinal groove 24 provided in distributing valve 2. This groove 24 opens into an annular groove 25 of said valve 2 which is in permanent communication with the pump housing 6.

The delivery circuit of the pump comprises a second longitudinal groove 26 starting from annular groove 25 and leading to a point located in the same transverse plane as the orifices of delivery conduits 8.

Thus it will be understood that injection begins when groove 26 ceases to communicate with a radial conduit 23 and that the end of injection occurs when groove 24 is placed in communication with another radial conduit 23.

A regulating system is provided for varying the angular position and the longitudinal position of distributing valve 2 with respect to driving shaft 4. A variation of the relative angular position of valve 2 produces a change of phase of the period for which no radial conduit 23 is in communication with either of the grooves 26 and 24, that is to say produces a variation of the advance to injection, whereas a variation of the relative longitudinal position of valve 2 produces a variation of the delivery of fuel per cycle of the pump if care is taken to limit grooves 26 and 24 by surfaces 26a and 24a, respectively, oblique with respect to the axis of the valve and located opposite radial conduits 23.

Shaft 4 carries a centrifugal governor adapted to exert upon a dish-shaped plate 28 an axial thrust variable in accordance with the speed of shaft 4. A transverse bar 28 is mounted so as to be slidable longitudinally with respect to shaft 4 and to have a helical movement with respect to valve 2 and this valve 2 is subjected, on the one hand, to the axial thrust exerted by plate 27 through a rigid connection between said plate 27 and said bar 28 and a spring connection 29 between transverse bar 28 and said slide valve 2, and, on the other hand, in the opposed direction, to the thrust of the return springs of the governor. Spring 29 and the return springs of the governor are chosen in such manner that the first one yields before the other, that is to say in such fashion that the angular position of valve 2 with respect to shaft 4 (advance to injection) is modified before the relative longitudinal position of said valve with respect to said shaft (variation of the delivery) is itself changed.

The centrifugal governor is made as follows:

Shaft 4 carries, fixed thereon, a plate 30 provided with recesses for driving in rotation centrifugal masses each constituted by a pair of balls 31 rotatably held in a radially guided cage 32, one of the balls of every pair being engaged in a recess of plate 30 and the other one bearing against the inner face of a plate 27. This plate 27 is fixed on a ring 33 rotatably mounted on shaft 4. Transverse bar 28 is provided with an extension forming a kind of socket containing spring 29 and housed in a hollow portion of shaft 4, bar 28 extending through longitudinal slots 34 provided in said hollow shaft portion. Ring 33 bears against bar 28. A pin 35 carried by bar 28 and engaged in an oblique groove 36 of slide valve 2 (FIG. 6) produces the above mentioned helical movement between this valve and shaft 4. The force of spring 29 may be adjusted by means of a nut 37.

Concerning the return springs of the governor, they are mounted along the common axis of shaft 4 and valve 2 and they are made to act upon the ends of said valve that project from body 1 on the side opposed to that where shaft 4 is located, these springs being preferably helical springs. For instance, there is provided a return spring 38, called "overload spring" acting normally in permanent fashion upon valve 2 and one or several return springs 39 and 40 called "regulating springs" acting upon said slide valve 2 only when the speed of the pump exceeds a given value, that is to say after the valve has already been given a preliminary axial displacement from its overload position. Spring 38 bears upon a plate 41, mounted at the end of valve 2, preferably with the interposition of a ball-bearing 42, and prevented from rotating by a pin 43, whereas springs 39 and 40 bear upon a second plate 44, mounted with a sliding fit on a rod 45 and the displacement of which toward valve 2 is limited by a shoulder 45a of said rod which determines the full load delivery rate. The usual throttle pedal control is arranged in such manner as to make it possible to increase the compression of return springs 38, 39 and 40, and, for this purpose, these springs bear on the side opposed to valve 2 upon a plate 46 coupled with throttle lever 47 which may be actuated from the outside of the casing through a spindle 48 and a lever 49 between two limit positions determined by adjustable abutments 50 and 51.

Furthermore, in order to permit stopping of the engine by reducing the delivery of the pump to zero, control means are provided which make it possible to displace valve 2 independently of the centrifugal governor, said control means acting upon plate 41 through an inner lever 52, a spindle 53 and an outer lever 54.

The pump further includes means for circulating fuel in the casing so as to lubrify the elements of the pump. Such a system may be arranged to produce a leak from groove 22 which is adjustable in such manner that this leak is always under pressure and fills the portions of the casing located on opposite sides respectively of body 1 and connected together by a passage 56. A valve 55 loaded to a pressure lower than the pressure of groove 22 limits the pressure in the casing.

The pump above described works in the following manner.

When shaft 4 is rotating together with its cam 7, pistons 5 are pushed alternately in the centrifugal direction under the action of spring 13 and in the centripetal direction under the action of cam 7. During every centrifugal stroke, fuel under pressure present in groove 22 passes through the conduit 23 located opposite grooves 24 and 26 and fills the volume created by the outward movement of pistons 5 in housing 6. During the centripetal movement of said piston, fuel is delivered into annular groove 25 and longitudinal grooves 24 and 26. As long as one of the conduits 23 is in register with groove 26, fuel is discharged through this conduit into annular groove 22 and there is no injection. As soon as valve 2, which turns at the same speed as cam 7, has closed this conduit through its inclined surface 26a, the fuel delivered by pistons 5 is fed through groove 26 to that of the delivery conduit 8 which is located opposite said groove 26 and is thus fed to the corresponding injector through connecting member 9. Injection then takes place until groove 24 opens, through its oblique surface 24a, the next conduit 23. Therefore the beginning and the end of injection are determined by oblique surfaces 26a and 24a.

The centrifugal governor is capable if varying the beginning and end of injection in the following manner.

During the first part of the displacement of balls 31 (toward the right hand side of FIG. 2) from the overload position of valve 2, plate 27 is displaced in the same direction while compressing spring 38 the resistance of which to compression is lower than that of spring 29. Plate 41 then comes into contact with plate 44. As balls 31 keep moving in the same direction, spring 29 (the resistance of which to deformation is lower than the sum of those of springs 38, 39 and 40) is now compressed when lever 47 is applied upon its full load abutment 51. Bar 28 accompanies the axial displacement of plate 27. Pin 35 moves in the oblique groove 36 of valve 2 which remains fixed in the axial direction and since this groove is oblique, the angular position of valve 2 with respect to shaft 4 is varied, which modifies the beginning of injection as above explained.

When the displacement of plate 27 becomes such that spring 29 has been so compressed that its resistance to compression has become higher than the resistance of the whole of springs 38, 39 and 40, these last mentioned springs are compressed. The axial position of valve 2 then varies from this time on and due to the obliquity of surfaces 24a and 26a, the amount of fuel delivered on every revolution of shaft 4 decreases as above explained.

In order to facilitate the starting of the engine, the overload spring 38 is compressed by bringing lever 47 upon its abutment 51 which displaces valve 2 to the maximum distance toward the left (FIG. 2). Since groove 24, which determines the end of injection, is shorter than groove 26, which determines the beginning of injection, groove 26 can no longer clear the orifices of conduits 23 and therefore stop injection. The total delivery supplied by pistons 5 is therefore conveyed to the injectors.

As soon as the engine has been started, balls 31 move radially in the outward direction and plate 27 is moved in such manner that plate 41 comes into contact with plate 44 which brings regulating springs 39 and 40 into play. Grooves 26 and 24 then determine the beginning and the end of injection according to the load determined by the position of lever 27.

In order to stop the engine, it suffices to act upon plate 41 by means of levers 52 and 54.

Such a pump has many advantages among which the following ones may be noted:

Valve 2 is of light weight and has practically no inertia;

The bearings 14 of shaft 4 are sufficiently distant from each other to permit the direct mounting of control members on the cone of shaft 4;

Undesirable leaks are avoided because there is only one bearing to be made tight between valve 2 and body 1 and the liquid tightness that is obtained is preserved practically for the whole life of the pump because the valve supports only itself and is not overhung or unbalanced;

It is possible to separate the fuel feed and discharge conduits represented by groove 22 from the inside of the casing for separate lubrication thereof.

In the embodiment of my invention which has been above described, the pump piston is reciprocable in a transverse cylindrical housing carried by the fixed body, and it is actuated by a cam rigid with the driving shaft. Furthermore, the distributing valve means and the regulating member are combined into a single element consisting of a rotary slide valve provided with distributing grooves and by-pass grooves limited by inclined surfaces such that the axial displacement of these slide valves, in the direction corresponding to an increase of the speed, reduces the amplitude of the angular displacement during which the pumping chamber is not by-passed.

I will now describe, with reference to FIGS. 8–13, another embodiment of a fuel injection pump according to my invention wherein the part in which is formed the cylindrical housing for the pump piston is rigid with the driving shaft, and said pump piston is actuated by a cam fixed with respect to the pump frame; furthermore, the regulating member consists of a sleeve in which said part is rotating, this sleeve cooperating with by-pass passages provided in said part.

The pump is constructed in such manner that fuel is forced through a conduit 61 provided in a shaft 4 driven, through a coupling 63, at a speed proportional and in particular equal to that of the internal combustion engine (not shown) to be fed by the pump. This conduit 61 is provided with by-pass passages 64 and 65, which extend through the wall of shaft 4 and which cooperate with a sleeve 66, having a fixed but adjustable position. The sleeve 66 fits about shaft 4 in a liquid-tight manner, and it is provided with by-pass holes 67, 68, 69 and 70 located along radii at 90 degrees to one another, the number of said holes being equal to the number of cylinders of the engine.

Figure 9:
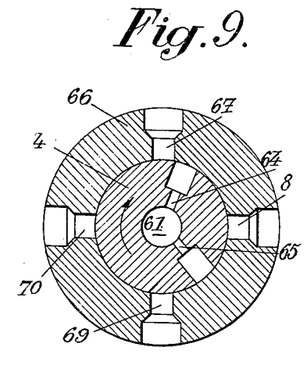
FIG. 9 is a cross-sectional view on the line IX—IX of FIG. 8, showing the driving shaft and the regulating sleeve.
Figure 10:
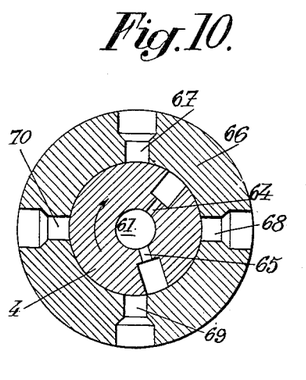
FIG. 10 is a view similar to FIG. 9, showing the parts in the position they occupy after a rotation of the shaft.
Figure 11:
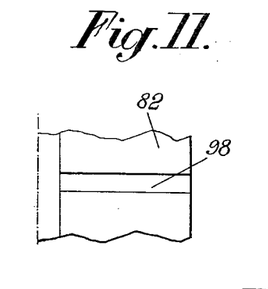
FIGS. 11 and 12 are plan views of the grooves formed in the control sleeve and in the regulating sleeve respectively.
Figure 12:
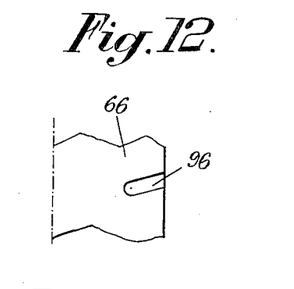

As shown by FIGURES 9 and 10, passage 65 extends along a line making an angle of about 120 degrees with the line of passage 64, the direction of rotation of shaft 4 being indicated by an arrow.

Figure 8:
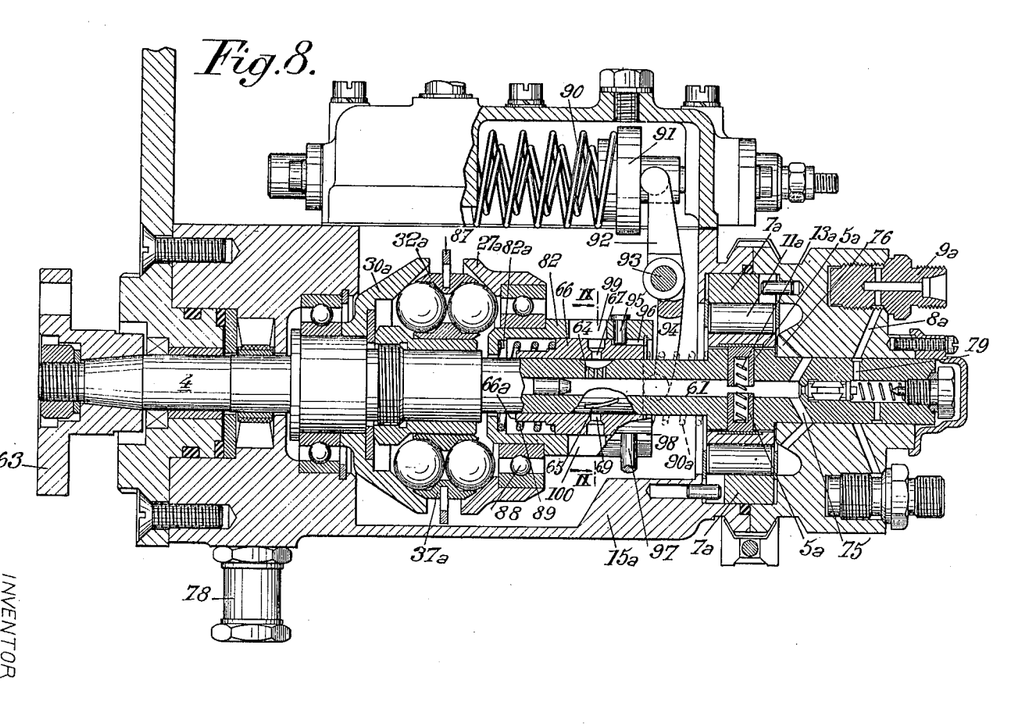
FIG. 8 is a diagrammatic axial sectional view of a fuel injection pump according to a second embodiment of the invention, the elements of this pump being shown in the position they occupy at low speeds of driving thereof.

Furthermore, as visible in FIGURE 8, passage 65 forms a kind of slot, oblique with respect to the axis of shaft 4, and passage 64 is similar, but inclined in the opposite direction.

Thus the distance between the respective outer ends of passages 64 and 65 in different cross-sections of shaft 4 is smaller as the plane of cross-section is nearer to the right-hand side of FIGURE 8.

Shaft 4 is formed with two radial bores in which are reciprocable two respective pistons 5a, applied by a spring 13a against rollers 11a adapted to run on a fixed annular cam 7a. The shape of this cam is such that pistons 5a have symmetrical movements with respect to the axis of shaft 4. Shaft 4 is further provided with radial passages 75 which communicate on the one hand permanently with longitudinal conduit 61 and on the other hand, during the suction strokes of pistons 5a, with intake conduits 76 provided in the wall of the casing 15a of the pump, which casing forms a fuel tank about shaft 4 and is provided with a fuel feed connection 78. Of course, during the inward strokes of pistons 5a (i.e. the delivery strokes of said pistons) conduits 75 are no longer in communication with conduits 76.

Shaft 4 is provided with a radial passage 79 intended to cooperate with a plurality of delivery conduits 8a formed in casing 15a and leading respectively to connections 9a in communication with the injectors. These conduits are arranged in such manner that a conduit 79 communicates with one of the conduits 8a during a fuel delivery stroke of pistons 5a. FIGURE 8 corresponds to the end of such a delivery stroke, that is to say to the time when communication between conduit 79 and one of the conduits 8a is going to be cut off and when the conduits 75 have just been placed in communication with conduits 76.

There is disposed with a sliding fit, about regulating sleeve 66, a control sleeve 82 movable axially under the action of a governor responsive to the speed of shaft 4. Sleeve 66 has its angular position determined by two sets of lugs and grooves provided respectively between sleeve 66 and sleeve 82 and between sleeve 82 and casing 15a. On the other hand, the axial position of this sleeve 66 is determined by two sets of springs interposed respectively between sleeve 66 and sleeve 82 and between sleeve 66 and an element having a fixed axial position with respect to shaft 4. The governor is a centrifugal one essentially constituted by a driving member 30a fixed on shaft 4 and by a receiver member 27a movable axially with respect to said shaft, these two members having opposed surfaces of frusto-conical shape. Driving member 30a is provided with recesses each of which accommodates one ball of a pair of balls 31a the other pair of each pair being engaged in a corresponding recess of the receiver member 27a. The two balls of each pair are rotatable in a cage 32a guided radially by means of an apertured disc 87. It will be understood that as the speed of shaft 4 increases, member 27a is more and more displaced towards the right, against the resistance of two sets of springs, which will be hereinafter described.

Advantageously, member 27a is connected to control sleeve 82 through a thrust ball-bearing 88.

Concerning the two above mentioned sets of springs, the first one may consist of a single spring 89, for instance a helical spring interposed between two respective shoulders belonging to sleeves 66 and 82, whereas the second set of springs consists of two springs 90 interposed between a fixed part of the pump frame (hidden by the pump casing at the upper part of the left-hand side of FIGURE 8) and a disc 91 slidable with respect to said casing. A lever 92, pivoting about a fixed axis 93, transmits the thrust of springs 90 from plate 91 to the edge of sleeve 66.

According to a modification, the last mentioned set of springs might be mounted about shaft 4 as shown at 90a on FIGURE 8, such a spring 90a being interposed between a shoulder belonging to shaft 4 and sleeve 66, its action being the same as that of springs 30. However, this arrangement would make it more difficult to adjust the strength of the springs.

Springs 89 and 90 are given characteristics such that spring 89 is weaker than springs 90 and therefore yields before them. Furthermore, sleeves 66 and 82 are provided with cooperating abutments 66a and 82a respectively, adapted to come into contact with each other before spring 89 is fully compressed. The relative displacements of sleeves 66 and 82 in the other direction are limited by ring 94.

The above mentioned sets of lugs and grooves are made as follows:

A lug 95 carried by sleeve 82 is slidable in a groove 96 formed in sleeve 66 and inclined with respect to the axis thereof. On the other hand, a lug or pin 97 carried by casing 15a is slidable in a groove 98 provided in sleeve 82, this groove 98 being parallel to the axis of shaft 4.

Sleeve 82 is provided with four passages at 90 degrees to each other, two of them, to wit 99 and 100, being shown on FIGURE 8, so as constantly to connect holes 67, 68, 69 and 70 with the fuel tank formed in casing 15a.

This fuel injection pump works as follows:

During the delivery strokes of pistons 5a, produced by cam 7a, as long as passage 64 and hole 67 are in communication, the fuel delivered by the pistons escapes through hole by-pass 67 and passage 99 into the fuel tank formed in casing 15a. As soon as passage 64 is closed by the inner wall of sleeve 66 (FIGURE 9) fuel under pressure can no longer escape through by-pass hole 67 and it is delivered through conduits 61, 79 and 8a toward the corresponding fuel injector through a connection 9a.

Injection takes place until by-pass hole 69 starts clearing passage 65 (FIGURE 10) because from this time on fuel can escape through hole 69 and passage 100 into the fuel tank.

During the next suction stroke of pistons 5a, which are then moving outwardly under the action of spring 13a, fuel enters conduit 61 through conduits 75 and 76, and also possibly through hole 69.

The same cycle of operations is repeated with holes 68 and 70, then 69 and 67, and finally 70 and 68. There are thus four fuel injections for every revolution of shaft 4, which corresponds to the cycle of operation of a four-stroke four-cylinder internal combustion engine.

The inclination of passages 64 and 65 is determined in such manner that when sleeve 66 is moved toward the right of FIGURE 8, the angle through which shaft 4 is rotated between the time when passage 64 has just been completely closed (FIGURE 9) and the time when passage 65 begins to be cleared (FIGURE 10), decreases, which involves a reduction of the fuel feed rate per cycle. Furthermore, obviously, when sleeve 66 is rotated either in the direction of rotation of the shaft 4 or in the opposed direction, the beginning of injection is either delayed or advanced respectively.

When the engine is running at a speed lower than a given value, spring 89 keeps sleeves 66 and 82 apart from each other in the position illustrated by FIGURE 8, sleeve 66 being in abutment against the end of lever 92, which is itself applied against disc 91, held by springs 90. So sleeve 82, under the action of spring 89, pushes disc 27a toward the left and keeps centrifugal weights 32a close to the axis of shaft 4. Both the axial and the angular positions of sleeve 66 with respect to shaft 4 are therefore well determined, and the flow rate per cycle and the relative timing of the beginning of injection are constant.

As soon as the speed of the engine exceeds the above mentioned value, centrifugal weights 32a move away from the axis of shaft 4, thus pushing toward the right plate 27a and sleeve 82 this last-mentioned sleeve being guided by the cooperation of pin 97 with groove 98. Since springs 90 are stronger than spring 89, this last-mentioned spring is the only one to be deformed and sleeve 66 is not displaced in the axial direction. As a result of the relative axial movement of sleeve 82 with respect to sleeve 66, a pin 95 sliding in groove 96 causes sleeve 66 to rotate about the axis of shaft 4 through an angle which depends upon the inclination of groove 96 (FIGURE 12) and upon the amplitude of the axial displacement of sleeve 82. Consequently the advance of injection increases as the speed of the engine increases.

Figure 13:
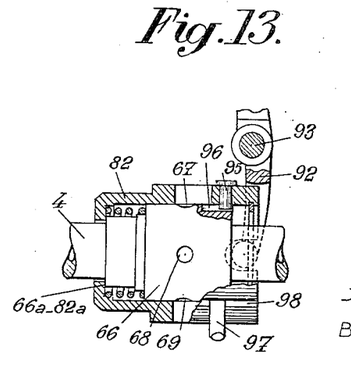
FIG. 13 shows, partly in elevation and partly in section, some of the elements of FIG. 8 in the position they occupy for an intermediate speed.

Sleeve 66 remains stationary in the axial direction until shoulders 66a and 82a come into contact with each other as shown by FIGURE 13. If then the speed of the engine further increases, the centrifugal forces created by weights 32a overcome the resistance of springs 90. Plate 27a then shifts toward the right the whole of sleeves 66 and 82. Since groove 98 is parallel to the shaft axis (FIGURE 11), sleeve 66 undergoes a translatory displacement toward the right, which produces a reduction of the flow rate for every cycle of the pump and a limitation of the speed of the engine to the desired value.

The law of regulation in accordance with the speed may be determined by a suitable choice of the characteristics of springs 90 and by an adjustment of the initial tensioning of these springs (possible while the engine is running) and also by a suitable shape of groove 96. Furthermore, it is possible, according to modifications, to incline groove 98 with respect to the axis on shaft 4, or at least a portion of said groove and/or to make groove 96 parallel to said axis for at least a portion of its length. Either of the grooves 96 and 98 may also include portions inclined alternately in one direction and in the other. The possibilities of regulation may thus be considerably increased in accordance with the characteristics of the engine to be fed with fuel and of the machine to be driven by said engine. Finally, the governor might be placed on shaft 4 on the other side of connection 63 from the pumping and distributing means.

The fuel injection pump, according to this embodiment of the invention, has many advantages, among which the following ones may be cited:

The regulating and advance variation functions are separated owing to the provision of separate springs adapted to be adjusted separately.

There are many possibilities of adjustment by varying the characteristics of resiliency of the springs, their initial tensioning, the possible displacements of the regulating sleeve with respect to the control sleeve and the shape of the grooves determining the relative movements of said sleeves.

The regulating means are centered on the shaft of the pump and the space they occupy is minimum.

The construction is simple and its cost is low.

The regulating means have a negligible inertia.

The present invention is a continuation in part of my prior patent applications Ser. No. 13,349, filed March 7, 1960, for Improvements in Fuel Injection Pumps, and Ser. No. 98,202, filed March 24, 1961, for Improvements in Fuel Injection Pumps, both of which are now abandoned.

In a general manner, while I have, in the above description, disclosed what I deem to be a practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. A fuel injection pump which comprises in combination, a frame forming a casing, a fixed body in said casing, a driving shaft journalled about an axis fixed with respect to said body, one of the two last mentioned parts being provided with at least one cylindrical housing transverse to said axis, a piston slidable in said housing so as to form therewith a pumping chamber, a cam carried by the other of said two parts, said cam being operatively conneced with said piston for imparting a reciprocating movement thereto in said housing in response to rotation of said shaft with respect to said body so as to produce a given number of pumping reciprocations of said piston during every revolution of said shaft, said body being provided with a cylindrical bore coaxial with said shaft, a distributing rotary valve fitting slidably in said bore, said valve being operatively connected with said shaft so as to be driven by it, a fuel tank, a plurality of fuel injectors, the number of said injectors being equal to said given number, said body being provided on the one hand with intake conduits each opening at one end into said bore and communicating at the other end with said fuel tank and on the other hand with delivery conduits each opening at one end into said bore and communicating at the other end with one of said fuel injectors respectively, said distributing valve being provided with distributing passages for placing, during every revolution of said shaft, said pumping chamber in communication with said delivery conduits successively and cyclically for respective time intervals and with distributing passages for placing said pumping chamber in communication with said intake conduits during time intervals occurring between said first mentioned time intervals, said distributing valve being further provided with discharge passages for periodically and cyclically short-circuiting the outflow of fuel through said delivery conduits, a member in said casing coaxial with said distributing valve and mounted to cooperate therewith for successively closing and opening said discharge passages, during every period for which one of said delivery conduits is in communication with said pumping chamber, said distributing valve and said member being movable relatively to each other both in the direction of said axis and by rotation about said axis, said discharge passages being arranged so that a relative axial movement between the two elements consisting respectively of said valve and said member produces a variation of the portion of every cycle of operation for which said discharge passages remain closed, whereas a relative movement of rotation between said two elements varies the phase of the cycle of operation with respect to the revolution of such shaft, a single speed governor mounted on said shaft, and means including a lost motion connection in the axial direction operatively connecting said governor to one of said two elements for producing in response to an increase of speed of said shaft first at lower speeds a relative rotation between said valve and said member to vary such phase of the cycle of operation without substantial relative axial displacement between said valve and said member and then at higher speeds a relative axial displacement between said valve and said member to vary the portion of the cycle of operation for which the discharge passages remain closed.

2. A fuel injection pump which comprises in combination, a frame forming a casing, a fixed body in said casing, a driving shaft journalled in said casing about an axis fixed with respect to said body, said body being provided with at least one cylindrical housing transverse to said axis, a piston slidable in said housing so as to form therewith a pumping chamber, a cam carried by said shaft, said cam being operatively connected with said piston for imparting a reciprocating movement thereto in said housing in response to rotation of said shaft with respect to said body so as to produce a given number of pumping reciprocations of said piston during every revolution of said shaft, said body being provided with a cylindrical bore coaxial with said shaft, a distributing rotary valve fitting slidably in said bore, means for operatively connecting said valve with said shaft so as to have said valve driven by said shaft, a fuel tank, a plurality of fuel injectors, the number of said injectors being equal to said given number, said body being provided on the one hand with intake conduits each opening at one end into said bore and communicating at the other end with said fuel tank and on the other hand with delivery conduits each opening at one end into said bore and communicating at the other end with one of said fuel injectors respectively, said distributing valve being provided with distributing passages for placing, during every revolution of said shaft, said pumping chamber in communication with said delivery conduits successively and cyclically for respective time intervals and with distributing passages for placing said pumping chamber in communication with said intake conduits during time intervals occurring between said first mentioned time intervals, said distributing valve being further provided with discharge passages for periodically and cyclically short-circuiting the outflow of fuel through said delivery conduits, a portion of said body coaxially surrounding said distributing valve to cooperate therewith for successively closing and opening said discharge passages, during every period for which one of said delivery conduits is in communication with said pumping chamber, said distributing valve being movable relatively to said shaft both in the direction of said axis and by rotation about said axis, said discharge passages being arranged so that a relative axial movement of said valve with respect to said shaft produces a variation of the portion of every cycle of operation for which said discharge passages remain closed, whereas a relative movement of rotation of said valve with respect to said shaft varies the phase of the cycle of operation with respect to the revolution of said shaft, and means, including a single centrifugal governor mounted on said shaft, for producing in response to an increase of speed of said shaft first a rotation of said valve with respect to said member and then a relative axial displacement of said valve with respect to said shaft.

3. A pump according to claim 2 in which said cam is integral with said shaft, said pump comprising ball bearings for supporting the whole of said shaft and said cam in said casing.

4. A pump according to claim 2 in which the means for operatively connecting said valve with said shaft have a slight flexibility in the radial direction, said valve being mounted with a sliding fit in said bore.

5. A pump according to claim 2 in which said means for operatively connecting said valve with said shaft comprise a bar transverse to said axis and mounted slidable longitudinally in said shaft, said bar being coupled in rotation with said shaft, said valve being provided with a helical groove in its periphery, a pin transverse to said axis rigid with said bar, said pin being engaged in said groove, whereby said bar can have a helical movement about said axis with respect to said valve, said centrifugal governor including a plate transverse to said axis and movable longitudinally in response to variations of speed of said shaft, said plate being applied against said transverse bar, spring means interposed between said bar and said valve for urging them longitudinally away from each other, and spring means between said casing and said valve for urging said valve longitudinally toward said shaft, said second spring means being stronger than said first mentioned spring means.

6. A pump according to claim 5 in which said last mentioned spring means consist of at least one helical spring having its axis in coincidence with the common axis of said shaft and said valve, said valve extending on both sides of said fixed body and said spring extending between said casing and the end of said valve located on the other side of said body from said shaft.

7. A fuel injection pump which comprises in combination, a frame, a driving shaft journalled in said frame, said shaft being provided with at least one cylindrical housing transverse to said axis, a piston slidable in said housing so as to form therewith a pumping chamber, a cam carried by said frame in fixed position with respect thereto, said cam being operatively connected with said piston for imparting a reciprocating movement thereto in said cylindrical housing in response to the rotation of said shaft with respect to said frame so as to produce a given number of pumping reciprocations of said piston during every revolution of said shaft, said frame being formed with a cylindrical bore coaxial with said shaft and a portion of said shaft fitting rotatably in said bore, a fuel tank formed inside said frame about said shaft, said frame being provided with a plurality of delivery outlets, the number of said outlets being equal to said given number, said frame being provided on the one hand with intake conduits each opening at one end into said bore and communicating at the other end with said fuel tank and on the other hand with delivery conduits each opening at one end into said bore and communicating at the other end with one of said delivery outlets respectively, said shaft being provided with a first set of distributing passages for placing, during every revolution of said shaft, said pumping chamber in communication with said delivery conduits successively and cyclically, for respective time intervals, and with a second set of distributing passages for placing said pumping chamber in communication with said intake conduits during time intervals occurring between said first-mentioned time intervals, said shaft being further provided with by-pass passages for periodically and cyclically short-circuiting the outflow of fuel through said delivery conduits, regulating member in said frame coaxial with said shaft and mounted to cooperate therewith for successively closing and opening said by-pass passages, during every period for which one of said delivery conduits is in communication with said pumping chamber, said member being movably guided in said frame both in the direction of said axis and by rotation about said axis, said by-pass passages being arranged so that a relative axial movement of said member produces a variation of the portion of every cycle of operation for which said by-pass passages remain closed, whereas a relative movement of rotation of said member about said shaft axis varies the phase of the cycle of operation with respect to the revolution of said shaft, a single speed governor mounted on said shaft, and means including a lost motion connection in the axial direction operatively connecting said governor to said member for producing, in response to an increase of speed of said shaft, first at lower speeds a relative rotation between said shaft and said member to vary such phase of the cycle of operation without substantial relative axial displacement between said shaft and said member and then at higher speeds a relative axial displacement of said member with respect to said shaft to vary portion of the cycle of operation for which the discharge passages remain closed.

8. A pump according to claim 7, wherein said regulating member is a sleeve fitting slidably about the portion of said shaft provided with said by-pass passages and movable both longitudinally and angularly about said shaft axis, said by-pass passages being two slots both connected with said pumping chamber, said two slots being offset angularly with respect to each other and being inclined in opposed directions, respectively with respect to the direction of the shaft axis, said control means comprising, in addition to said governor, which comprises a part fixed longitudinally with respect to said shaft and a part movable longitudinally with respect to said shaft in response to variations of the speed of rotation thereof, a control sleeve fitting slidably about said regulating sleeve and guided longitudinally with respect to said frame, said control sleeve being operatively connected with said second-mentioned part of said regulator so as to be moved longitudinally with respect to said last-mentioned part in response to longitudinal displacements thereof, first spring means interposed between said regulating sleeve and said frame for yieldably opposing longitudinal displacements of said regulating sleeve with respect to said shaft, second spring means interposed between said regulating sleeve and said control sleeve for yieldably opposing longitudinal displacements between said two sleeves, said first spring means being stronger than said second spring means, and guiding means between said two sleeves for causing said regulating member, as long as it is prevented from moving longitudinally by said first spring means, to rotate about said shaft axis in response to longitudinal displacement of said control sleeve, said regulating member being provided with four radial passages at 90 degrees to one another and arranged to cooperate with said by-pass passages of said shaft, and said control sleeve being provided with four radial passages at 90 degrees to one another and arranged to keep said four radial passages of said regulating member constantly in communication with said fuel tank.

References Cited in the file of this patent

UNITED STATES PATENTS

| | | |
|---|---|---|
| 2,790,432 | Shallenberg et al. | Apr. 30, 1957 |
| 2,828,727 | Fischer | Apr. 1, 1958 |